United States Patent Office 3,806,536
Patented Apr. 23, 1974

3,806,536
META-3-ALKOXYUREIDOPHENYL N-HALOALKYL CARBAMATES
Kenneth P. Dorschner and James A. Albright, Jacksonville, Fla., assignors to SCM Corporation, Cleveland, Ohio
No Drawing. Filed Dec. 22, 1971, Ser. No. 211,111
Int. Cl. C07c 127/18, 127/20, 157/08
U.S. Cl. 260—479 C                4 Claims

ABSTRACT OF THE DISCLOSURE

New m - (3 - alkoxyureido and 3 - alkoxythiouredio) phenyl carbamates wherein at least one valence of the carbamate nitrogen is satisfied by a halogen-substituted lower alkyl group are shown to be selective herbicides.

BACKGROUND OF THE INVENTION

U.S. Pat. 3,547,979 is believed to show compounds which are the closest analogs to those of the instant invention. The compounds of that patent are alkylcarbamoyloxyphenyl N-alkoxyureas and are described as useful weed killers. Our co-pending application entitled "Meta Ureidophenyl N-Haloalkyl Carbamates" also teaches close analogs as selectively effective herbicides. Additional generally relevant but more remote art known to applicants is listed in the attachment to this application.

It has been found that a minor modification of one substituent radical satisfying a valence of the carbamate nitrogen of the foregoing carbamoyloxyphenyl N-alkoxyureas provides the crop grower with a selective herbicide, i.e. a compound or composition which will kill or stunt the growth of weeds in a germinating or growing crop without harming the plant crop beyond the point of recovery.

BRIEF SUMMARY OF THE INVENTION

This invention relates to: new 3-alkoxylated ureidophenyl and thioureidophenyl carbamates wherein at least one valence of the carbamate nitrogen is satisfied with a halogen-substituted lower alkyl group; such compounds as herbicides including compositions comprising a selectively effective herbicidal amount of such compounds; and a method of protecting crop plants including peanuts, soybeans, corn, cotton and rice from undesirable weed growth by depositing a selectively effective herbicidal amount of such compounds to the locus of the plant.

DETAILED DESCRIPTION OF THE INVENTION

The novel 3-alkoxylatedureidophenyl carbamates of this invention include the corresponding thioureido and thiocarbamate derivatives characterized in that at least one of the valences of the carbamate nitrogen is satisfied by a halogen-substituted lower alkyl group and the second valence is satisfied by either hydrogen, a lower alkyl group or by a halogen-substituted lower alkyl group depicted generally as:

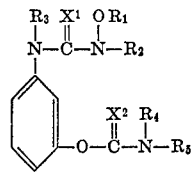

Wherein $X^1$ and $X^2$ represent either oxygen or sulfur; $R_1$ and $R_2$ are the same or different lower alkyl groups, $R_3$ is a lower alkyl group or hydrogen, $R_4$ is a lower alkyl group, hydrogen or a halogen-substituted lower alkyl group $R_5$ is a halogen-substituted lower alkyl group. Unless otherwise defined, lower alkyl group signifies a straight or branched chain alkyl group of 1 to 6 carbon atoms.

Of the above illustrated 3-alkoxylatedureidophenyl carbamates the compounds where $R_3$ and $R_4$ are hydrogen and $R_1$ is methyl appears to be the most effective and economical. Surprisingly, the novel compounds of this invention have been found to control selectively undesired weeds when used as pre-plant, pre-emergent and post-emergent herbicides for crop plants, in contrast to the close analogs in U.S. Pat. 3,434,822 and specifically 3,547,979 which are generally used for complete eradication of weed species or in some cases for an after-harvest treatment control of weeds in the subsequently planted crop. It was not anticipated that this preplanting type herbicide could be easily modified by replacing the tertiary butyl group or lower alkyl group with a halogen-substituted lower alkyl group to produce a truly effective selective herbicide that would find use as post-emergence herbicides.

The novel compounds of this invention may be prepared by general methods described in the literature for the synthesis of 3-alkoxylatedureidophenyl carbamates. One method is to first prepare the m-aminophenyl haloalkyl carbamate and react it with phosgene to produce the corresponding isocyanate which is then further reacted with the appropriate N,O-dialkylhydroxylamine to give the desired meta-alkoxyureidophenyl haloalkyl carbamate. Other methods known in the art may be used but attention must be given in any particular synthesis to protect reactive groups and to prevent undesired side reactions from taking place. In addition to the sensitive alkoxy groups on the urea portion of the molecule some precaution must be taken to prevent possible quaternization reactions which can take place between a halide and a tertiary amine. Other synthetic approaches may involve the reverse preparation where the 1-alkoxy-3-(m-hydroxyphenyl) urea is first prepared and then reacted with the desired haloalkyl isocyanate.

Examples of halogen-substituted lower alkyl groups of 1 to 6 carbon atoms on the carbamate nitrogen include methyl, ethyl, n-propyl, isopropyl, butyl, n-butyl, sec-butyl, tert-butyl, pentyl and hexyl groups and the like. Halogen atom substitution can be at any of the carbons of such alkyl group, but compounds of this type where the halogen is on terminal carbon atoms are preferred because of their availability and because they have been found especially effective. Plural halogen substitution on the same or different carbon atoms is possible. The halogen atom substituent can be chlorine, iodine, bromine or fluorine, but is preferably chlorine since the chloroalkyls are highly effective and economical to prepare. When $R_1$, $R_2$, $R_3$, and $R_4$ in the above formula represent lower alkyl groups, methyl and ethyl groups are generally preferred because of their economy.

Specific compounds illustrative of the formula which are very effective and selective in eliminating and controlling weeds including mustard (Brassica spp.), coffee weed (Sesbani spp.), pig weed (Amaranthus spp.), crab grass (Digitaria spp.), barnyard grass (Echinochola spp.), giant foxtail (Setaria spp.) annual morning glory (Ipomoea spp.), Texas Panicum (Panicum texanum), and the like without significant injury to the specific crops such as rice, corn, cotton, peanuts and soybeans are as follows:

O-[m-3-methoxy-3-methylureido)phenyl] N-(2-chloroethyl) carbamate
O-[m-(3-methoxy-3-methylureido)phenyl] N-(3-chloropropyl) carbamate
O-[m-(3-methoxy-3-methylureido)phenyl] N-(4-chlorobutyl) carbamate
O-[m-(3-methoxy-3-methylureido)phenyl] N-(2-trifluoroethyl) carbamate O-[m-(3-methoxyureido)phenyl] N-(2-chloroethyl) carbamate O-[m-(3-methoxyureido)phenyl] N-(3-fluoropropyl) carbamate O-[m-(3-methoxyureido)phenyl] N-(2,3-dichloropropyl) carbamate S-[m-(3-methoxy-3-methylureido)phenyl] N-(2-chloroethyl) thiocarbamate S-[m-(3-methoxy-3-methylureido)phenyl] N-(3-chloropropyl) thiocarbamate O-[m-(3-methoxy-3-methylureido)phenyl] N-(2-chloropropyl) thiocarbamate O-[m-(3-methoxy-3-methylureido)phenyl] N-(3-chloropropyl) thiocarbamate The compounds of this invention can also be named as carbamic acids, esters with various ureas or as carbamates according to the IUPAC Rules, examples of which would be:

(2-chloroethyl) carbamic acid, ester with 3-(m-hydroxyphenyl)-1-methoxy-1-methylurea or m-(3-methoxy-3-methylureido)phenyl (2-chloroethyl) carbamate.

By crop plants is generally meant agricultural crops which are used for food supply of man and animals, but this also includes other desirable plants such as grass and lawn grass species where broadleaved and grassy undesirable weeds are to be controlled, suppressed, or eradicated.

Although climatic and soil conditions dictate the desirable application rate of these N-halogen - substituted alkyl carbamates, they are generally used from about ⅛ to about 8 pounds per acre based on the weight of the N-haloalkyl carbamate in the composition. Amounts smaller than ⅛ and amounts greater than 8 pounds per acre can be utilized, depending on the crop to be protected, the location, and the undesirable weed species to be killed. Conventional formulations can be used to apply these heribicides but applications as wettable powders dispersed in an aqueous medium are preferred when the carbamate is relatively insoluble in the application solvent. Wettable powders can be formulated from inert carriers such as clays, talc, diatomaceous earth and other siliceous inorganic solids and silicates. Although the wettable powder can contain any proportion of active heribicide from 1 to 98 percent, it is generally more economically feasible to use a high loading of active selective herbicide material. Active ingredient concentrations of 50–90 percent based on weight of inert carrier is recommended, and concentrations in the order of 80 weight percent active ingredient are preferred it is desirable that both the inert carrier and herbicide, if solids, be ball-milled or ground by other common techniques to a very fine state of subdivision so that they will pass through a 325-mesh screen (U.S. Standard Sieve).

The formulation can contain various other agents to wet, disperse, and emulsify the herbicidal composition whether or not a solvent is used in the application to the locus of the plant or to the soil. The surfactants or other detergents employed can be anionic, nonionic, or cationic as are detailed in McCutcheons 1969 publication on Detergents and Emulsifiers. Surfactants useful in formulation of our selective herbicides, are usually added in amounts of 1 to 10 percent based on the total weight of wettable powder formulation but generally in the order of 2 percent. These can be alkyl and alkylaryl polyether alcohols, polyoxy ethylene sorbitols, or sorbitan fatty acid esters, alkylaryl sulfonates, long chain quaternary ammonium chlorides, and the like. Preferred surfactants are the fatty esters of inorganic salts of isethionic acid and especially preferred is the oleic ester of sodium isethionate.

The compounds of this invention are best applied as herbicides as a broadcast treatment whereby the compound is emulsified in water or as a wettable powder formulated with wetting agents and applied as an aqueous spray over the entire area of land, which can include the crop plant. Water emulsions may be prepared with the aid of emulsifiers such as triethanol amine stearate, sodium lauryl sulfonate, sodium alkyl naphthalene sulfonate, sodium oleate, p-t-octylphenoxypolyethoxy ethanol, as well as other well-known emulsifiers. Similary, these herbicides can be applied as a preplant treatment to the area before the crop or weeds emerge from the soil. In this case, application is made after planting the crops. The compounds of this invention, as shown in the examples, can be effectively used by either of the above treatments, but are especially beneficial as post-emergent treatment when application is made after the emergence of a particular crop or weed. The characteristic of a good selective herbicide is that when it is applied near or on the foliage of the crop plant, only the weed species is killed while the valuable crop plants are not harmed beyond the point of recovery, thus allowing a high percentage (80–100 percent) to mature to harvestable crops. In this respect the compounds of this invention differ considerably from the 3-alkoxylatedureidophenyl carbamates of the prior art which generally were found to be non-selective herbicides useful as soil sterilants and post-harvest herbicidal treatments for subsequent planting as shown in U.S. 3,547,979.

The following examples are intended to illustrate the invention but not to limit the scope thereof, parts and percentages being by weight unless otherwise specified.

EXAMPLE 1

Meta aminophenyl N-2-chloroethylcarbamate

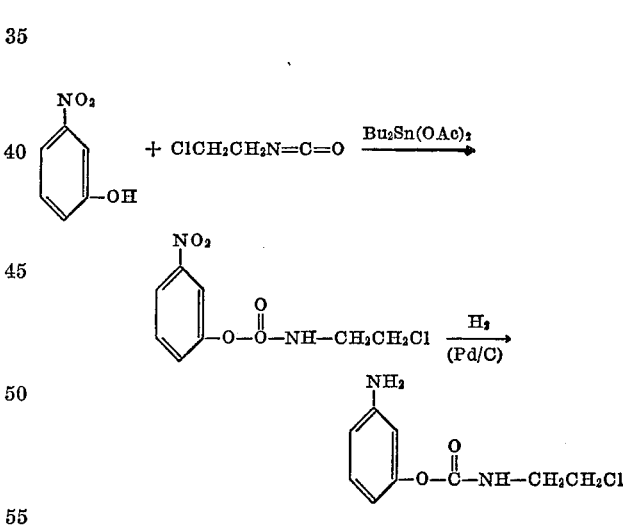

To 139 parts meta nitrophenol in 600 parts tetrahydrofuran is added with stirring 106 parts 2-chloroethylisocyanate using 5 ml. dibutyltin diacetate catalyst. After standing four hours the mixture is poured into a beaker containing 600 parts ice and is neutralized with 0.2 N sodium hydroxide solution. The resulting m-nitrophenyl N-2-chloroethylcarbamate is collected, washed with ice water, and dried.

24.4 parts meta-nitrophenyl N-2-chloroethylcarbamate dissolved in 100 parts ethylacetate is hydrogenated in a Paar hydrogenation apparatus using 2.5 parts 10% palladium on carbon catalyst until the hydrogen is no longer absorbed. After degassing with nitrogen, the catalyst is filtered and the solvent is removed under reduced pressure. The residue is essentially m-aminophenyl N-2-chloroethylcarbamate.

EXAMPLE 2

O-[m-(3-methoxy-3-methylureido)phenyl] N-(2-chloroethyl) carbamate

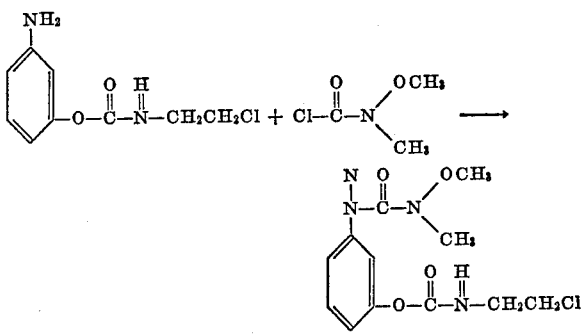

To 215 parts meta aminophenyl N-(2-chloroethyl) carbamate in 400 parts 1,2-dimethoxyethane is added 107 parts N-methoxy-N-methyl carbamyl chloride while stirring magnetically at room temperature and the resulting mixture is allowed to stand for several hours before separating the above identified carbamate.

EXAMPLE 3

O-[m-(3-methoxy-3-methylureido)phenyl] N-(3-chloropropyl) carbamate

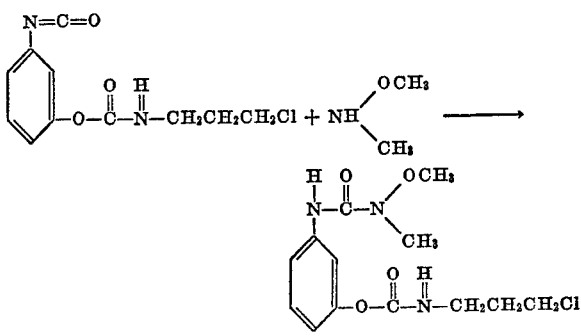

229 parts meta-aminophenyl N-3-chloropropyl carbamate, prepared in a manner similar to that shown in Example 1 except that 3-chloropropyl isocyanate is used in place of 2-chloroethylisocyanate is dissolved in 400 parts tetrahydrofuran containing 202 parts triethylamine and added dropwise to a solution of 98 parts phosgene dissolved in 500 parts tetrahydrofuran while carefully maintaining the temperature below 10° C. After completion of the reaction, the mixture is filtered to remove triethylamine hydrochloride and the filtrate is evaporated to yield O-[m-(3-methoxy - 3 - methylureido)phenyl N-(3-chloropropyl) carbamate.

EXAMPLE 4

When the compound of Example 2, formulated as a wettable powder, is applied to various plant foliage as an aqueous spray at the rate of 1.5 pounds active ingredient per acre, and the plants are inspected 21 days later, peanut plants will exhibit no apparent injury whereas mustard, coffeeweed, and barnyard grass are killed. Selectivity in favor of growing rice, corn (maize) and cotton while suppressing one or more of such pest weeds is expected also.

Other compounds similar to those illustrated above can be synthesized by the techniques shown and well known to those skilled in the art. Examples of representative types which may be formulated and used as selectively effective herbicidal compositions are:

EXAMPLE 5

S - [m - (3 - methoxy - 3 - methylureido)phenyl] N-(2-chloroethyl) thiocarbamate

EXAMPLE 6

O - [m - (3 - methoxy - 3 - methylureido)phenyl] N-(2-chloroethyl) thiocarbamate

EXAMPLE 7

O-[m - (3 - methoxy - 3 - methyl - 2 - thioureido) phenyl] N-(2-chloropropyl) carbamate

EXAMPLE 8

S - [m - (3 - methoxy - 3 - methyl - 2 - thioureido) phenyl] N-(2-chloroethyl) thiocarbamate

EXAMPLE 9

O - [m - (methoxy - 3 - methylureido)phenyl] N-(3-fluoropropyl) thiocarbamate

EXAMPLE 10 m - (3 - methoxy - 2 - thioureido)phenyl N-(4-chlorobutyl) carbamate

EXAMPLE 11 m - (3 - methoxy - 3 - methylureido)phenyl N-(1,2-dichloroethyl) carbamate

EXAMPLE 12

O - [m - (3 - methoxy - 3 - methylureido)phenyl] N-(cyclo - 2,3 - dichlorotetramethylene) carbamate

EXAMPLE 13

O - [m - (3 - methoxy - 3 - methylureido)phenyl] N-(2,2,2-trifluoroethyl) carbamate

What is claimed is:

1. A compound of the formula

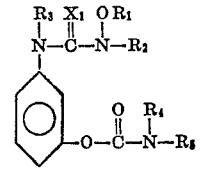

wherein $X^1$ represents either oxygen or sulfur; $R_1$ and $R_2$ are the same or different lower alkyl groups, $R_3$ is a lower alkyl group or hydrogen, $R_4$ is a lower alkyl group, hydrogen or a halogen-substituted lower alkyl group and $R_5$ is a halogen-substituted lower alkyl group.

2. A compound of claim 1 wherein $R_4$ is hydrogen and $R_5$ is a chlorinated or brominated alkyl.

3. O-[m-(3-methoxy - 3 - methylureido)phenyl] N-(3-chloropropyl) carbamate.

4. O - [m - (3 - methoxy-3-methylureido)phenyl] N-(2-chloroethyl) carbamate.

References Cited

UNITED STATES PATENTS

| | | | |
|---|---|---|---|
| 3,547,979 | 12/1970 | Brantley | 260—479 |
| 3,711,492 | 1/1973 | Rohr et al. | 260—302 |

JAMES A. PATTEN, Primary Examiner

U.S. Cl. X.R.

71—99, 100, 106; 260—326.3, 455 A